(12) United States Patent
Sun et al.

(10) Patent No.: US 10,950,146 B2
(45) Date of Patent: Mar. 16, 2021

(54) MOISTURE RESPONSIVE MATERIALS, METHODS OF MAKING AND METHODS OF USE

(71) Applicant: University of Connecticut, Farmington, CT (US)

(72) Inventors: Luyi Sun, Storrs, CT (US); Songshan Zeng, Willington, CT (US); Dianyun Zhang, Vernon, CT (US)

(73) Assignee: UNIVERSITY OF CONNECTICUT, Farmington, CT (US)

( * ) Notice: Subject to any disclaimer, the term of this patent is extended or adjusted under 35 U.S.C. 154(b) by 6 days.

(21) Appl. No.: 15/680,359

(22) Filed: Aug. 18, 2017

(65) Prior Publication Data

US 2018/0053445 A1    Feb. 22, 2018

Related U.S. Application Data

(60) Provisional application No. 62/377,234, filed on Aug. 19, 2016.

(51) Int. Cl.
*G09F 3/03* (2006.01)
*C08J 5/18* (2006.01)
(Continued)

(52) U.S. Cl.
CPC ............ *G09F 3/03* (2013.01); *B32B 3/30* (2013.01); *B32B 25/08* (2013.01); *B32B 25/20* (2013.01);
(Continued)

(58) Field of Classification Search
CPC ............ B32B 2307/728; B32B 2307/73; C08J 2329/04; C08J 2429/04
See application file for complete search history.

(56) References Cited

U.S. PATENT DOCUMENTS

2009/0047197 A1*  2/2009  Browne ............... F16D 28/00
                                                422/307
2013/0101804 A1*  4/2013  Brokken ............. G06F 3/016
                                                428/172
(Continued)

OTHER PUBLICATIONS

Rodriguez-Hernandez (Wrinkled interfaces: Taking advantage of surface instabilities to pattern polymer surfaces. Prog. Polym. Sci. (2014)).*

(Continued)

*Primary Examiner* — Alicia J Sawdon
(74) *Attorney, Agent, or Firm* — Cantor Colburn LLP

(57) ABSTRACT

A moisture responsive system comprising: a thin film polymer layer, wherein the thin film polymer comprises a hydrophilic polymer; and a substrate polymer layer, wherein the substrate polymer comprises a hydrophobic elastomer; wherein the thin film polymer layer is attached to the substrate polymer layer at a bottom surface of the thin film polymer layer and the thin film polymer layer has a top surface opposing the bottom surface is provided. A method of making a moisture responsive system, comprising: applying a thin film polymer layer to a foundation; applying a substrate polymer layer on the thin film polymer layer; curing the substrate polymer layer to form a thin film polymer layer/substrate polymer bilayer; and removing the thin film polymer layer/substrate polymer bilayer from the foundation is provided. A method of using such a moisture responsive system by applying moisture to the moisture responsive system is provided.

17 Claims, 9 Drawing Sheets

(51) Int. Cl.
  *B32B 25/08*  (2006.01)
  *B32B 25/20*  (2006.01)
  *B32B 3/30*   (2006.01)

(52) U.S. Cl.
  CPC ............ *C08J 5/18* (2013.01); *B32B 2250/02* (2013.01); *B32B 2307/728* (2013.01); *B32B 2307/73* (2013.01); *C08J 2329/04* (2013.01); *C08J 2383/04* (2013.01); *C08J 2429/04* (2013.01)

(56) References Cited

U.S. PATENT DOCUMENTS

| | | | |
|---|---|---|---|
| 2014/0147510 A1* | 5/2014 | Lahann | A61K 9/1647 424/501 |
| 2015/0158244 A1* | 6/2015 | Tibbits | C08F 220/20 428/516 |

OTHER PUBLICATIONS

Kim et al. (Effects of the Degree of Crosslinking of Poly(vinyl alcohol) membranes, Poly. J. (1993)).*

Basu et al. (J. Appl. Phys. Wrinkling of a two-layer polymeric coating 98, 063507; 2005).*

Hyun et al. (J. Appl. Polym. Sci. Substrate Thickness: An effective control parameter for polymer thin film buckling on PDMS substrates 112, 2683; 2009).*

Kim, J. et al., "Wrinkles and deep folds as photonic structures in photovoltaics", Nature Photonics, May 2012, vol. 6, pp. 327-332.

Guvendiren, M. et al. "Swelling-Induced Surface Patterns in Hydrogels with Gradient Crosslinking Density", Advanced Funtional Materials, 2009, vol. 19, pp. 3038-3045.

Kim, H. et al., "Solvent-Responsive Surface via Wrinkling Instability", Advanced Materials, 2011, vol. 23, pp. 4188-4192.

Everyday Mysteries—Fun Science Facts From the Library of Congress. The Library of Congress. Retrieved from https://www.loc.gov/rr/scitech/mysteries/wrinkles.html on Dec. 8, 2017, 3 Pages.

Kareklas, K. et al. "Water-induced finger wrinkles improve handling of wet objects", Biology Letters, 2013, vol. 9(2), 20120999. Doi: 10.1098/rsbl.2012.0999 (Jan. 2013).

Zeng, S. et al. "Bio-inspired sensitive and reversible mechanochromisms via strain-dependent cracks and folds", Nature Communications, Jul. 8, 2016; 9 Pages.

Zeng, S. et al. (2016) Tuning the Dynamics of Moisture Responsive Wrinkles. AIChE Annual Meeting, Nov. 15, 2016, San Francisco, CA. Retreived from https://aiche.confex.com/aiche/2016/webprogram/Paper456436.html on Dec. 11, 2017, 2 Pages.

Zeng, S. et al. "Multi-Responsive Wrinkling Surfaces with Tunable Dynamics", Advanced Materials, 2017, vol. 29, 1700828, 7 Pages.

* cited by examiner

MOISTURE RESPONSIVE MATERIALS, METHODS OF MAKING AND METHODS OF USE

CROSS-REFERENCE TO RELATED APPLICATIONS

This application claims priority to U.S. Provisional Application Ser. No. 62/377,234 filed Aug. 19, 2016, the content of which is hereby incorporated by reference in its entirety.

FIELD

The disclosure contained herein is in the general field of moisture-responsive wrinkling materials and surfaces having dynamic response properties that are tunable.

BACKGROUND

Surface instability, such as wrinkles, commonly occurs in various materials with a wide scope of dimensions. In nature, the skin of human fingers, which consists of an epidermis and a dermis layer, becomes wrinkled after prolonged exposure to water, while a flat skin surface returns as dried. Moreover, the aged face skin becomes thinner and less elastic due to dehydration, leading to the formation of wrinkles, creases, and lines, and cosmetic surgery can remove these unwanted aging signs by restoring the skin's thickness and elasticity. The skin wrinkle dynamics (such as reversibility and stability) can be modified by external stimuli, and are affected by the skin's structure and properties. There remains a need for materials that change their optical qualities upon various combinations and sequences of exposure to moisture and drying conditions.

SUMMARY

A moisture responsive system comprising: a thin film polymer layer, wherein the thin film polymer comprises a hydrophilic polymer; and a substrate polymer layer, wherein the substrate polymer comprises a hydrophobic elastomer; wherein the thin film polymer layer is attached to the substrate polymer layer at a bottom surface of the thin film polymer layer and the thin film polymer layer has a top surface opposing the bottom surface is provided. A method of making a moisture responsive system, comprising: applying a thin film polymer layer to a foundation; applying a substrate polymer layer on the thin film polymer layer; curing the substrate polymer layer to form a thin film polymer layer/substrate polymer bilayer; and removing the thin film polymer layer/substrate polymer bilayer from the foundation is provided. A method of using a moisture responsive system, comprising: providing a moisture responsive system comprising: a thin film polymer layer, wherein the thin film polymer comprises a hydrophilic polymer; and a substrate polymer layer, wherein the substrate polymer comprises a hydrophobic elastomer; wherein the thin film polymer layer is attached to the substrate polymer layer at a bottom surface of the thin film polymer layer and the thin film polymer layer has a top surface opposing the bottom surface; and applying moisture to the moisture responsive system is provided.

BRIEF DESCRIPTION OF THE FIGURES

Referring now to the figures, which are exemplary embodiments, and wherein the like elements are numbered alike.

DETAILED DESCRIPTION

Described herein are embodiments of three types of moisture responsive wrinkling surfaces having different dynamics when exposed to high humidity (also referred to as moisture) environments. Each of the three embodiments is based on a bilayer structure. All three surfaces are initially flat and form wrinkles as the surfaces are moisturized, but each displays different responsive behaviors when further moisturized, dried and re-moisturized. The word "flat" and other forms of that word means that the surface or a portion thereof is within 10% of its initial topography or amplitude. The word "wrinkle" and other forms of that word means that the surface or a portion thereof is not flat. A wrinkle can be identified using a change in optical properties, such as UV-Vis transmittance and reflectance spectra, or a viewing of the surface profile using a profilometer, or viewing under a microscope, or fast Fourier transform image and diffraction pattern via small angle light scattering. As used herein, "moisture" or "humidity" or other forms of those words mean a relative humidity of at least 40%, preferably greater than 80%. As used herein, the think film polymer layer and substrate polymer layer being "attached" includes any method of attachment, such as chemical or physical, including interfacial adhesion.

Described herein are materials, assemblies, systems, devices, methods of making the same and methods of using the same.

Figure 1:
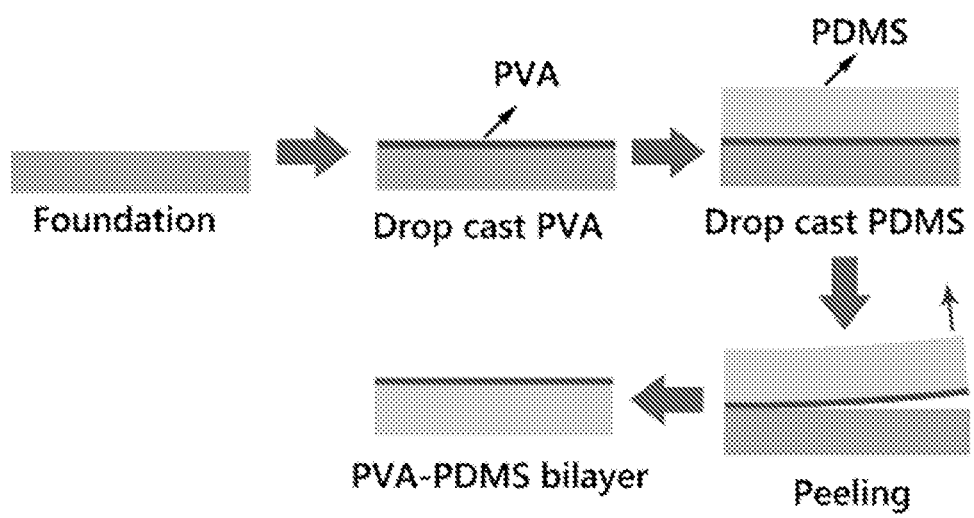
FIG. 1 shows a schematic diagram of the preparation of exemplary bilayer systems.

The inventors herein have discovered a series of moisture-sensitive film-substrate bilayer devices, denoted as Samples A, B, and C, that use a stiff hydrophilic film, such as polyvinyl alcohol (PVA) film tightly adhered onto a hydrophobic soft substrate, such as polydimethylsiloxane (PDMS) via a simple preparation approach as shown in FIG. 1. The thickness of the PVA film, PVA crosslinking degree/gradient, PDMS modulus and PVA-PDMS interface can be varied and controlled. Upon using a cool mist of moisture (relative humidity (RH)>100% in the tested sample area) generated by an ultrasonic humidifier in the open air as a moisture stimulus, three distinctively different wrinkling systems have been discovered, as summarized in FIG. 2. Specifically, when subjected to repeated moisturizing-drying cycles, Sample A exhibits reversible wrinkles forming-disappearing behavior; Sample B only temporarily shows wrinkles formation at the beginning of the moisture exposure, while the wrinkles disappear during the subsequent moisturizing and never reappear in the following drying/re-moisturizing processes; and Sample C demonstrates permanent wrinkles once exposed to moisture, regardless of the subsequent moisturizing and drying conditions. The materials, assemblies, systems, devices, methods of making the same and methods of using the same are further described herein.

In an embodiment of a surface with responsive dynamics, referred to herein as Sample A, highly opaque wrinkling surfaces can be rapidly generated upon application of moisture and the wrinkling surface can be sustained for about 30 seconds (s) followed by returning to transparent flattening surfaces upon further moisture exposure; no wrinkling surface is created when the flattened surface is re-exposed to moisture. The wrinkling time is proportional to the thickness, degree of hydrolysis, and molecular weight of the PVA. Therefore, modification of one or more of these parameters can alter the time the wrinkles sustain. This embodiment allows the design of a moisture responsive encryption device, for example, with the capability of "erase after read". In this exemplary application, a label can be revealed by applying moisture and then can be permanently erased by further moisture exposure.

In an embodiment of a surface with responsive dynamics, referred to herein as Sample B, a wrinkling surface can be rapidly generated upon application of moisture and the wrinkled surface remains stable regardless of further moisture exposure time. Upon drying, the wrinkles are released back to an original flattening surface. The wrinkling and flattening surface of this second embodiment can be repeatedly and reversibly created during multiple dry/moisture cycles. An exemplary application of this second embodiment comprises a breathing activated anti-counterfeit tab or label in which a label can be activated and revealed by breathing on it, and the label will disappear after one stops breathing on it.

In an embodiment of a surface with responsive dynamics, referred to herein as Sample C, a wrinkling surface can be generated upon application of moisture and remains stable in either a moisturized state or a dried state. This surface can utilized as a water exposure indicator for electronic circuits and devices, as an anti-glare surface, or as an optical diffusor, for example. For a water indicator example, a Sample C embodiment can be attached on a circuit board. Wetting the surface can reveal a hidden pattern/notation such as "$H_2O$" or a word, for example, and the pattern/notation will permanently remain visible under both wet and dry conditions. The excellent light scattering properties of Sample C wrinkle surfaces allow the fabrication of a water indicator, anti-glare films and light diffusor materials.

The wrinkle surfaces, materials and systems described herein can be made without the need of any special equipment. Examples of applications based on the wrinkle surfaces, materials and systems include anti-counterfeit tabs, encryption devices, water indicators, anti-glare films, and light diffusors.

The different moisture responsive behaviors for the surfaces, materials and systems described herein can be achieved by slightly changing the fabrication parameters, such as the degree of crosslinking and the crosslinking gradient, PVA thickness, or PDMS modulus as described herein. One can thereby control and tune the moisture responsive behaviors of devices and systems.

The various drying/moisturizing steps for Samples A, B, and C as described herein and depicted in the figures were generally performed at room temperature. In alternative embodiments a temperature range from 2 to 60 degrees C. can be used. These temperatures are based on the steps performed at a temperature below the glass transition temperature of PVA, which is about 85 degrees C. Other hydrophilic materials with higher glass transition temperature can be used to achieve wider temperature range, such as polystyrene sulfonic acid.

The film/substrate assemblies of Samples A, B, and C described herein retain their specific moisture responsiveness characteristics for at least 6 months when stored at room temperature.

For exemplary embodiments of Samples A, B, and C, the thickness of the substrate layer can be 1 millimeters (mm) to 3 mm and the thickness of the film layer can be 0.1 μm to 15 μm.

For exemplary embodiments of Samples A, B, and C, the substrate comprises any hydrophobic elastomer such as PDMS, and the top film comprises any hydrophilic polymer such as PVA.

Hydrophilic polymers suitable for use in embodiments described herein comprise polyvinylalcohol (PVA), polystyrene sulfonate, polyacrylic acid, polyethylenimine, other water or organic soluble polymers, or a combination comprising at least one of the foregoing. In an embodiment, the hydrophilic polymer is PVA having a weight average molecular weight (Mw) of 10,000 to 100,000.

Hydrophobic elastomers suitable for use in embodiments described herein comprise polyurethane rubber, polyacrylate rubber, acrylic rubber, natural rubber, fluoroelastomers, ethylene-propylene rubber (EPR), ethylene-butene rubber, ethylene-propylene-diene monomer rubber (EPDM), epichlorohydrin rubber, acrylate rubbers, hydrogenated nitrile rubber (HNBR), silicone elastomers, polyether block amides, ethylene vinyl acetate, styrene-butadiene-styrene (SBS), styrene-butadiene rubber (SBR), styrene-(ethylene-butene)-styrene (SEBS), acrylonitrile-butadiene-styrene (ABS), acrylonitrile-ethylene-propylene-diene-styrene (AES), styrene-isoprene-styrene (SIS), styrene-(ethylene-propylene)-styrene (SEPS), methyl methacrylate-butadiene-styrene (MBS), high rubber graft (HRG), polydimethylsiloxane (PDMS), or a combination comprising at least one of the foregoing.

The systems can include a UV sensitizer or other crosslinking agent. Crosslinking agents and UV sensitizers that can be used include sodium benzoate, ammonium dichromate, benzoic acid, iron(III) chloride, and other materials known to one of ordinary skill in the art. Concentrations of UV sensitizers are known in the art, and generally range from 0.01 weight percent to 10 weight percent of the thin film polymer layer.

The preparations of the aforementioned wrinkling surfaces are generally as illustrated in FIG. 1. Initially, a thin PVA film (thickness ranging from 1.9 to 6.7 µm for different devices, with or without an ultraviolet (UV) sensitizer) is prepared by drop-casting on a plastic foundation. Other foundations such as a silicon wafer, Teflon petri-dish, or a glass slide can be used. A liquid PDMS layer is then cast atop the film and then thermally cured to generate a thick, soft layer about 1 mm thick. This process can be repeated to cast multiple PDMS layers. The approach allows the low surface energy liquid PDMS (20.4 millinewtons per meter (mN/m)) to form a strong adhesion with the PVA thin film. The multi-layer sheet is then carefully peeled away from the plastic foundation prior to the moisture treatment or the possible UV crosslinking of the PVA film.

For an exemplary embodiment of Sample A, a uniform covalently crosslinked PVA thin film (thickness=1.9 µm) is attached atop PDMS substrate (base: curing agent ratio=65:1, Elastic Modulus about 30 kilopascals (kPa)) with strong interfacial adhesion. An exemplary embodiment of Sample B is the same as sample A except for having a non-covalently crosslinked PVA. For an exemplary embodiment of Sample C, a PVA film (thickness=6.7 µm) with crosslinked gradient across the film (the crosslinking degree is higher on the interface between air and the PVA thin film) attached firmly on the PDMS substrate (base: curing agent ratio=35:1, Elastic Modulus about 110 kilopascals (kPa)). The covalent crosslinking is achieved by adding UV sensitizer (such as sodium benzoate) into the PVA and crosslinking under UV radiation, as known to one of ordinary skill in the art without undue experimentation.

Figure 2:
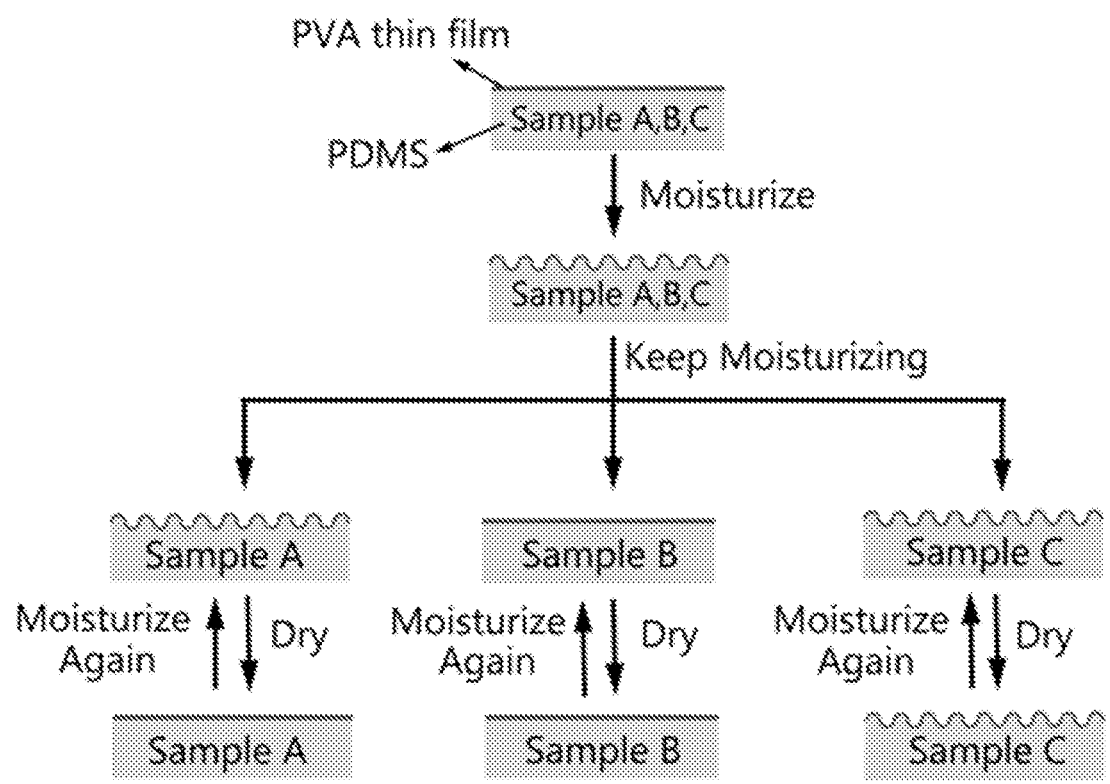
FIG. 2 shows a schematic diagram of the different responsive dynamics and designed structures of three moisture responsive wrinkle devices. The wavy shape of the top surface of the bilayer structure indicates the formation of wrinkles, the flat shape of the top surface of the bilayer structure indicates a flat surface.
Figure 3:
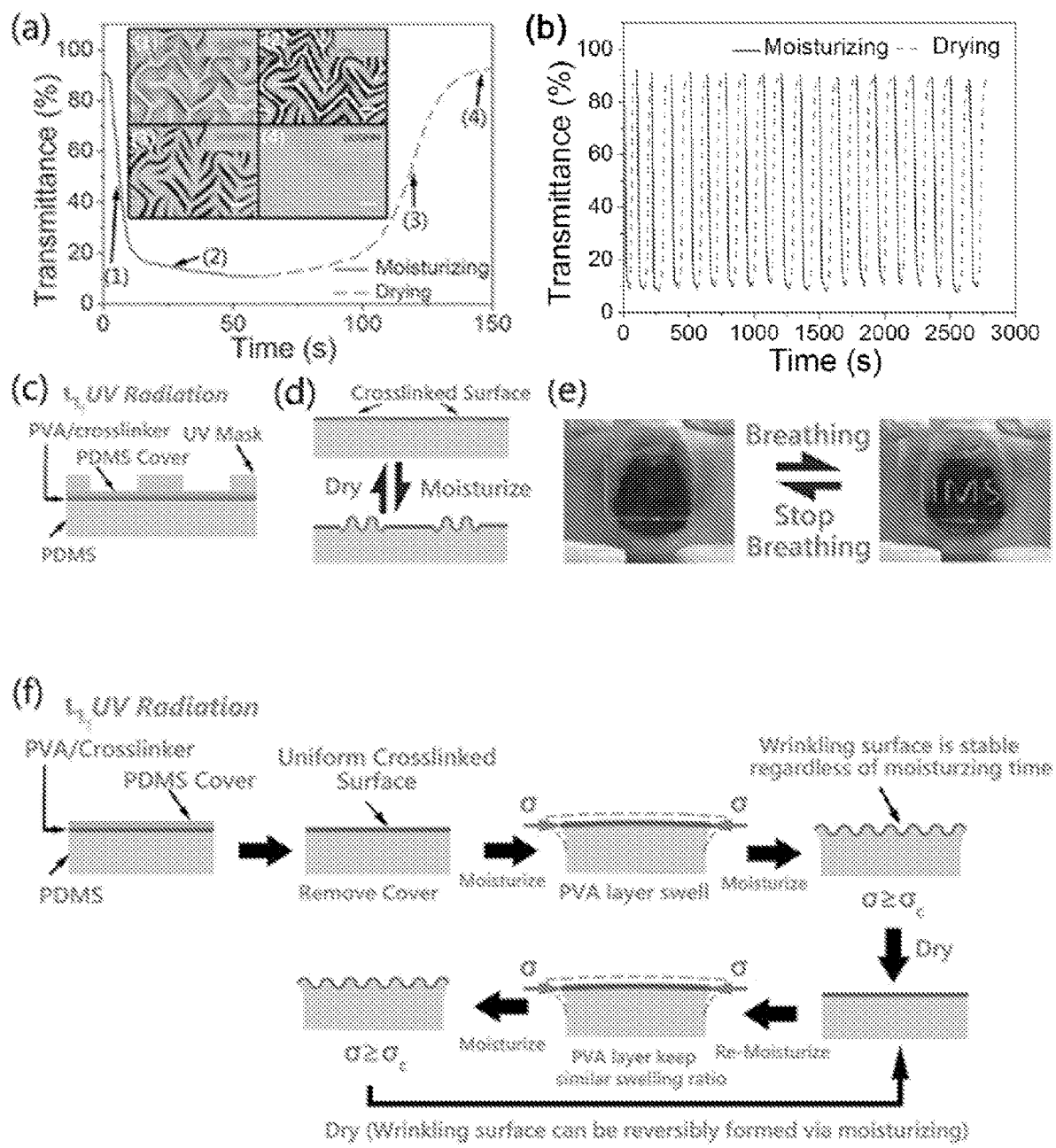
FIG. 3 shows (a) the UV-Vis spectra showing the evolution of direct transmittance of Sample B with moisture exposure and drying time; the inset photos are microscopic and macroscale images of wrinkling or flattening surface for the four stages labelled as (1)-(4) on UV-Vis spectra (scale bar=100 micrometers (μm)); (b) the direct transmittance of Sample B upon 20 moisturizing/drying cycles showing the reversible moisture responsive behaviors; (c) a schematic diagram of the set-up for preparing an anti-counterfeit tab; (d) a schematic diagram for the responsive behavior of the anti-counterfeit tab; (e) a demonstration showing the hidden pattern "IMS" can be reversibly revealed by breathing; (f) a schematic diagram of Sample B moisture responsive dynamics.
Figure 4:
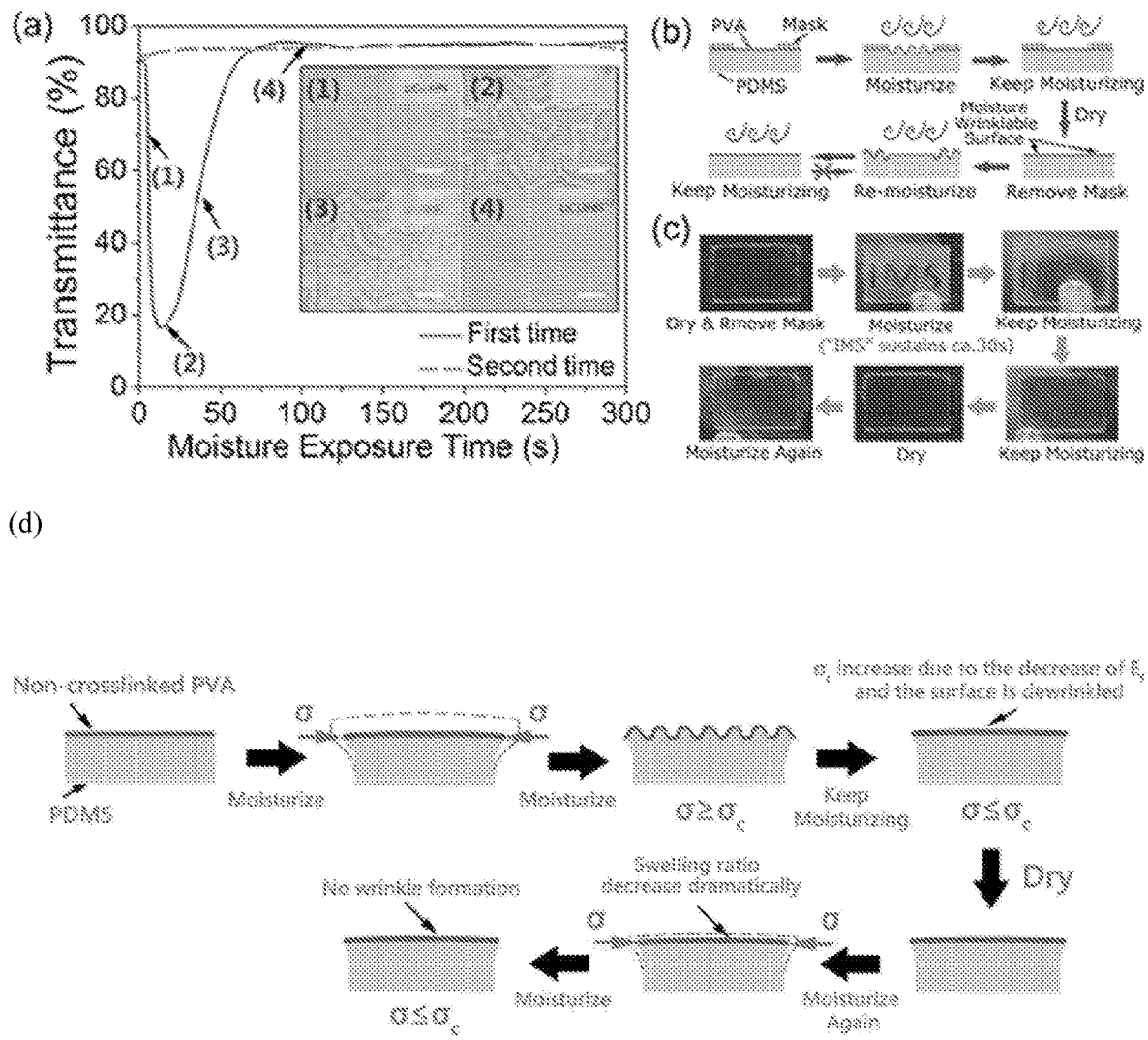
FIG. 4 shows (a) the UV-Vis spectra showing the evolution of transmittance of Sample A with moisture exposure time (the second moisture exposure was applied on the same sample after it dried from first moisture exposure); the inset photos are microscopic and macroscale images of wrinkling or flattening surface for the four stages labelled as (1)-(4) on UV-Vis spectra (scale bar=100 μm); (b) preparation of a moisture responsive encryption device based on Sample A; (c) responsive behavior of the encryption device upon exposure to moisture, being dried, and re-exposure to moisture; (d) two dimensional simulation of Sample A structure with flat surface as dried, wrinkle surface during exposure to moisture, and moisture responsive dynamics.
Figure 5:
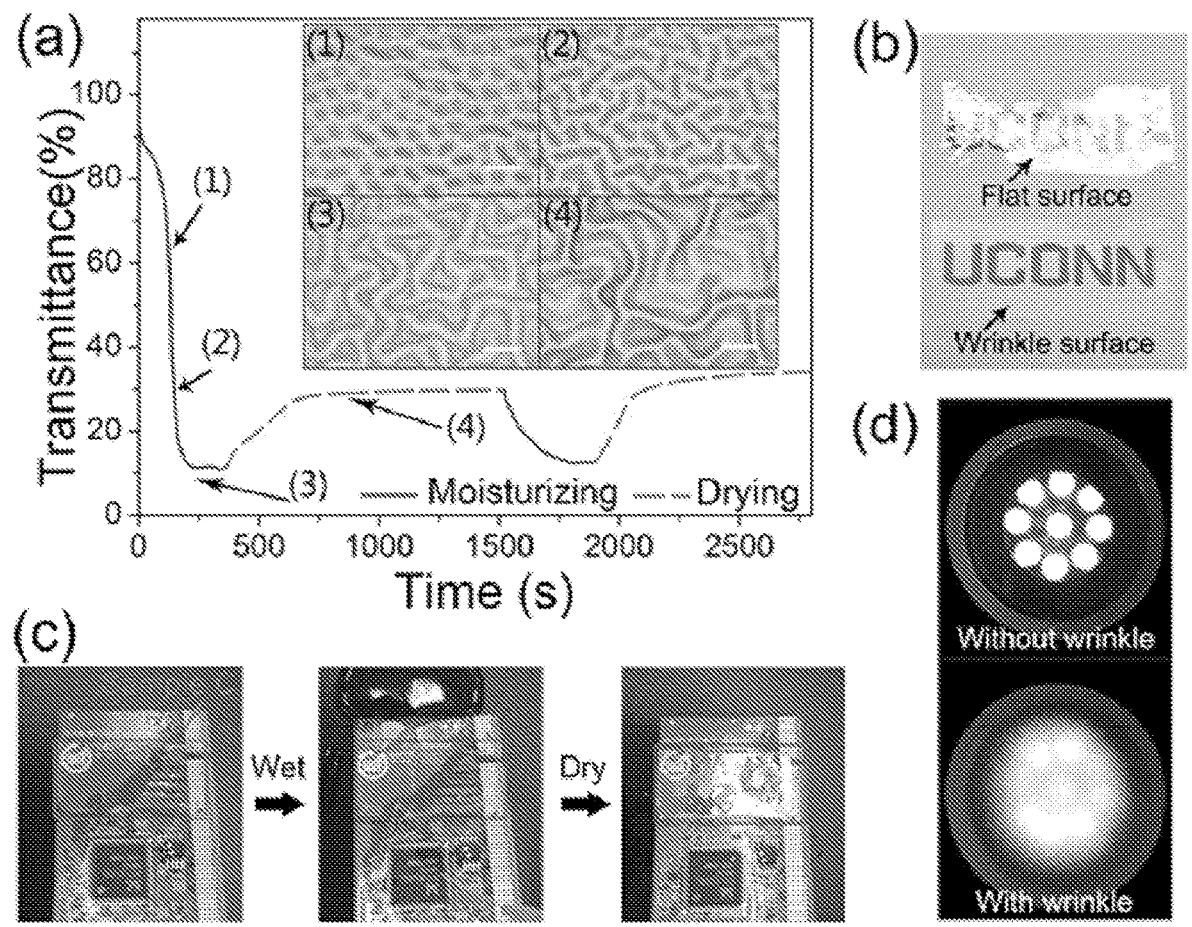
FIG. 5 shows (a) UV-Vis spectra showing the evolution of direct transmittance of Sample C with moisture exposure and drying time; the inset photos are microscopic and macroscale images of wrinkling or flattening surface for the four stages labelled as (1)-(4) on UV-Vis spectra (scale bar=100 μm); (b) demonstration of the anti-glare properties of Sample C wrinkle surface; (c) the water indicator prepared based on Sample C attached on a circuit board, and the hidden "H$_2$O" pattern being revealed after the PVA surface contacted with water; (d) demonstration of Sample C wrinkle surface using as light diffusor; (e) schematic of the wrinkle formation in Sample C; (f) graph showing intensity as a function of viewing angle for sample C as a diffusor and without diffusor.

For the embodiments and experiments described herein, a flow of cool mist (relative humidity (RH)>100%) generated by an ultrasonic humidifier is used as the moisture stimulus source to generate wrinkle surfaces for the three devices. The same moisture sources are used for all the experiments unless otherwise mentioned. All the top PVA surfaces of three samples are initially flat and formed wrinkles as they are moisturized. However, these wrinkling surfaces have different responses upon being further moisturized, dried, and re-moisturized. In Sample A, surface wrinkling can be rapidly generated as the surface is moisturized, and it is stable in a wet state. Upon drying, the wrinkles are released back to the original flat surface (see FIG. 2). The wrinkling and flattening of the surface can be repeatedly and reversibly created upon multiple dry/wet cycles (FIG. 3($b$)). A corresponding novel application of a breath activated anti-counterfeit tab is demonstrated. In Sample B, wrinkling surfaces with high macroscale opaqueness can be rapidly generated as the surface is moisturized for 5 s, and it can sustain for about 30 s, followed by a relaxation back to transparent flattening surfaces upon further exposure to moisture (FIG. 2 & FIG. 4($a$)). Notably, wrinkles do not develop on the sample surface any more upon being re-exposed to moisture after drying. This unique dynamics allows the design of a moisture responsive encryption device with the capability of "erase after read" (FIG. 4($b$) and FIG. 4($c$)). In Sample C, surface wrinkling can be generated as the surface is moisturized, and it can keep stable in the subsequent wet and dry cycles. This responsive surface can be applied as water indicators for electronic circuits, light diffusors, and anti-glare films, for example (FIG. 2 & FIG. 5).

Although Applicant does not wish to be bound by theory, the formation of surface wrinkles in the film-substrate material system is believed to be described based on linear buckling theory. In a film-substrate bilayer system, surface wrinkling phenomenon is considered a stress-driven instability occurring in the compressive film layer. Therefore, to tune the moisture-activated wrinkling dynamics, it is important to control both the moisture-induced compressive deformation in the film and the evolution of structural relaxation and film stiffness as a function of the applied deformation under moisturizing-drying cycles.

The minimum compressive stress in the thin film required to form wrinkles, i.e., critical stress, $\sigma_c$, and the corresponding critical strain, $\varepsilon_c$, can be computed as Equation (1), $$\sigma_c = -\frac{1}{4}\left(9\overline{E_f} \cdot \overline{E_s}^2\right)^{1/3}, \varepsilon_c = -\frac{1}{4}\left(\frac{3\overline{E_s}}{\overline{E_f}}\right)^{2/3} \quad (1)$$

where $\vec{E_f}$ and $\vec{E_s}$ are the plane-strain moduli of the PVA film and the PDMS substrate, respectively. The wavelength $\lambda$, and the amplitude, A, of the wrinkles, are correlated to the thickness of the PVA thin film, t, and the film-to-substrate modulus ratio are shown as Equation (2), $$\lambda = 2\pi t\left(\frac{\overline{E_f}}{3\overline{E_s}}\right)^{1/3}, A = t\left(\frac{\varepsilon_0}{\varepsilon_c} - 1\right)^{1/2} \quad (2)$$

where $\varepsilon_0$ is the applied compressive strain. Note that the linear buckling theory only suggests the critical conditions for wrinkles formation and the corresponding mode shape. This theory cannot be used to study the evolution of the wrinkling response since the modulus of the film changes rapidly in the moisture conditions. To fully understand the three different wrinkling dynamics, finite element (FE) models, which incorporate the swelling effect and the modulus change of PVA in response to moisture, were developed to predict the dynamic wrinkling behavior when the bilayer structure undergoes moisturizing-drying cycles.

Figure 6:
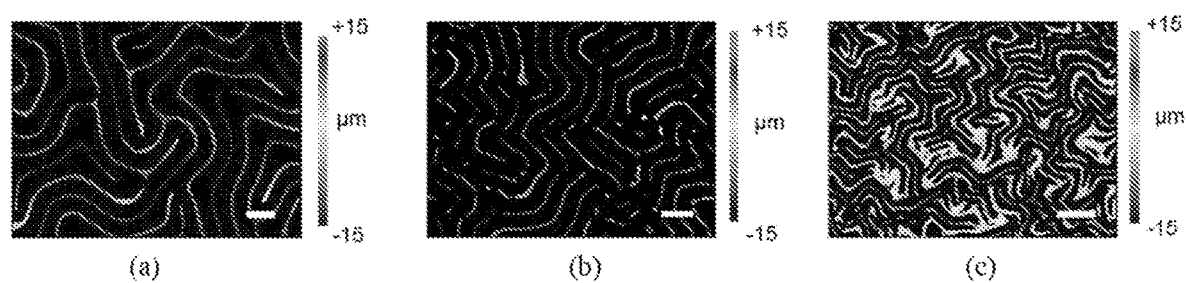
FIG. 6 shows white light profilometer diagrams of (a) Sample A wrinkling surface after 10 seconds (s) of moisture exposure; (b) Sample B wrinkling surface after 10 s of moisture exposure, (c) Sample C wrinkling surface in the dried state (scale bar=100 μm).

In Sample A, which shows reversible wrinkling dynamics under moisturizing-drying cycles, the PVA film was uniformly crosslinked with a thickness of 1.9 µm and an elastic modulus of about 1059 MPa at 30% RH. A soft PDMS (base to curing agent ratio=65:1, thickness about 1 mm) with an elastic modulus of about 30 kPa was used as the substrate. To maintain the wrinkles in the moisturizing conditions, the decrease of the PVA film modulus induced by the penetrated water molecules is carefully controlled so that the compression in the film exceeds the critical value for wrinkles formation. Thus, a crosslinked PVA was used because of its ability to maintain a stable and moderate modulus through effectively restricting polymer chain mobility as exposed to moisture. The crosslinking reaction was carried out via adding a UV sensitizer sodium benzoate into the PVA matrix. A schematic of the wrinkling dynamics is shown in FIG. 4(d). Since the diffusion of oxygen across the film consumes radicals and restrains the crosslinking reaction, the PVA thin film was covered by a removable PDMS film to block the oxygen diffusion and ensure uniform crosslinking. Formation of wrinkling surfaces can induce a change of direct transmittance due to light scattering effect of buckled structures. The PVA-PDMS bilayer system is transparent at the flattened state, and becomes opaque when the wrinkles develop on the top surface. Thus, the wrinkles forming-disappearing dynamics can be visualized and illustrated through the sample's UV-Vis transmittance spectra plotted against the time of moisturizing or drying (FIG. 3(a)). The spectrum indicated that wrinkles formed when the sample was moisturized for 6 s and then maintained stable during the subsequent moisturizing process. An initial tension stress is built up on the PVA film during the processing of casting and UV crosslinking. Once exposed to moisture, this tensile stress is released, followed by the swelling of the PVA film. After removing the moisture source, the wrinkling surface was released back to a flat surface at a slower rate by 1.4 times compared to the wrinkles formation process, because extra time is needed to evaporate the moisture from the PVA film. To better illustrate this wrinkles-induced optical response, a printed "UCONN" logo was placed under the bilayer to indicate the transparency of the material. The relationship between wrinkles formation and transparency change is shown in the inset in FIG. 3(a), where the optical microscope (OM) images of the wrinkling PVA top surface and the corresponding insets showing the visibility of the "UCONN" logo captured at four characteristic points denoted as 1-4 in FIG. 3(a)). The logo became invisible during the formation of isotropically oriented wrinkles (wavelength=128 μm, FIG. 6 (a)), accompanied by a decrease in the light transmittance; once the sample was reversed back to a flatten surface, it exhibited a high transparency. This is because the swelling strain in the PVA film decreased upon drying, resulting in a decrease in the compressive stress that prevents the wrinkles from occurring. Owing to the structural stability of the crosslinked polymer and generally comparable equilibrium swelling ratio under cyclic moisture absorption and desorption, the transition between surface wrinkling and flattening can be reversibly generated upon repeated moisturizing and drying cycles (FIG. 3(b)).

Figure 7:
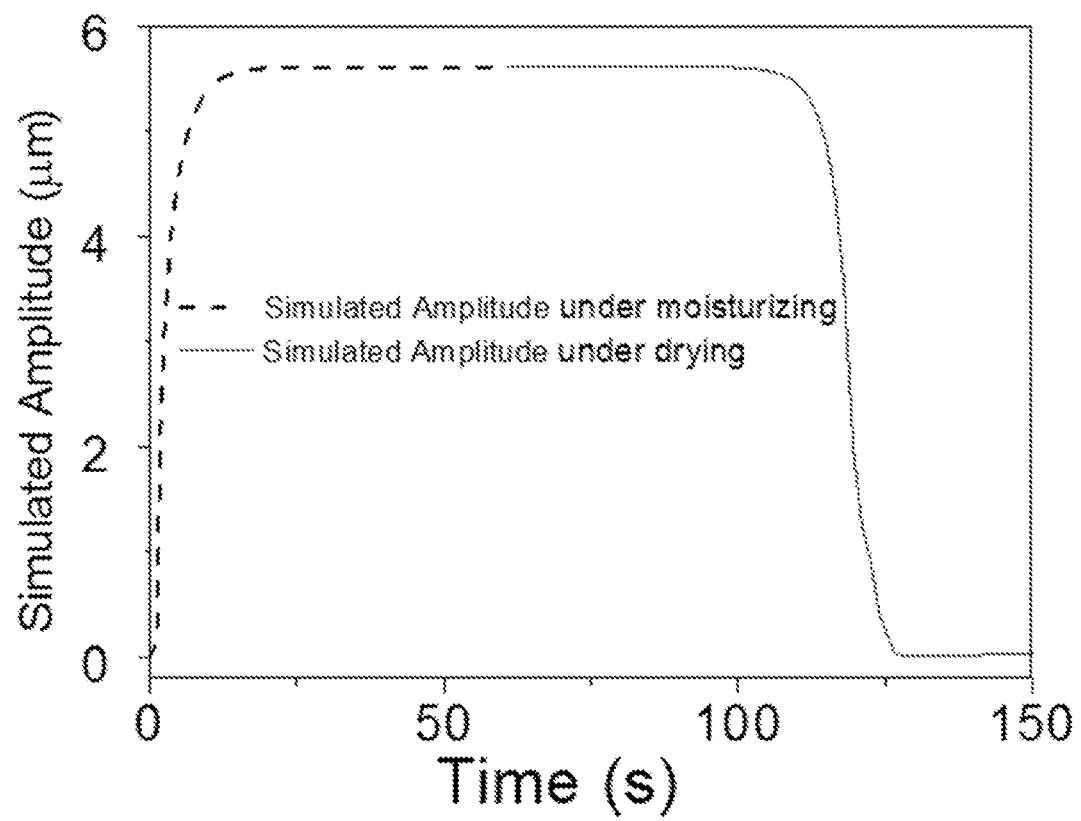
FIG. 7 shows the evolution of simulated wrinkle amplitude of Sample A in the first moisturizing-drying cycle.

The forming-disappearing wrinkling dynamics was further investigated through a 2D finite element (FE) model. The PVA film was tied onto the PDMS substrate by enforcing the displacement continuity at the interface. Here, the dynamic process of wrinkle formation and deformation formation in the bilayer system is described by accounting for the change of the modulus of PVA when it is exposed to moisture. The analysis was carried out using the commercial FE software, ABAQUS (version 6.14), and moisture-dependent properties, including the swelling strains and the change of the modulus of PVA (decreased first and then became virtually constant under the subsequent moisturizing), were incorporated into the simulation through a user-defined material subroutine, UMAT. The determination of the moisture-dependent properties and the detailed procedures of implementing UMAT are not provided here. Note that the wrinkles formed in Sample A remain stable, because the wrinkle develops after the modulus of the PVA film becomes constant. The evolution of the predicted wrinkle amplitude correlates well with the UV-Vis transmittance spectra (FIG. 7.). This reversible wrinkling phenomenon can be used in a revealable moisture responsive pattern by generating wrinkles regionally only. Details of the fabrication process and responsive scheme are provided in FIG. 3(c) and FIG. 3(d). Besides humidifiers, other high humidity sources, such as breathing, can be a convenient and effective approach to reversibly activate this device (see FIG. 3(e)). FIG. 3(f) shows a schematic diagram of Sample B moisture responsive dynamics.

The second wrinkling behavior achieved in this bilayer system is to permanently erase the wrinkles formed during the first moisture exposure, denoted as Sample B. Herein, a non-crosslinked PVA (elastic modulus about 950 MPa at 30% RH) was used as thin film. The PDMS substrate was the same as the one used in Sample A. The non-crosslinked PVA can swell under moisture conditions, similar to its cross-linked counterpart. However, this type of PVA is highly susceptible to moisture, because water molecules can easily induce plasticization of its amorphous regions and destruction of its crystalline regions, resulting in a significantly lowered modulus in a high RH environment. Thus, the modulus of the PVA film of Sample B decreased dramatically as moisturized. Additionally, during the drying process after the first moisture exposure, the PVA molecular chains came into closer proximity, which created an increasing number of hydrogen bonds to form new crystalline zones. This increased crystallinity led to a significant reduction of available —OH sites for water absorption during the re-moisturizing process, resulting in a great decrease of swelling degree and preventing the wrinkles from re-appearing. As a result, the wrinkles developed during the initial moisturizing process as soon as the critical condition was reached, while the continuous degradation of the film modulus led to the disappearance of wrinkles. Upon re-moisturizing after drying, the significantly decreased swelling strain of the film was insufficient to induce a compressive stress higher than the critical value. Thereby, no wrinkles formed in the following moisturizing/drying cycles. The wrinkles formation-disappearing phenomenon displayed by Sample B is shown in FIG. 4(d). The corresponding UV-Vis transmittance spectra in the first two moisturizing cycles are shown in FIG. 4(a). The wrinkles only sustained for about 30 seconds under the moisturizing-drying cycles. A PVA with a degree of hydrolysis (DH) of 88% was selected, allowing the ease of moisture penetration to the polymeric network and the rapid reduction of film modulus, offering a suitable observation time window for optical devices. The DH can be altered to achieve a different time for wrinkle formation and wrinkle disappearance. If MOIWOL 28-99 PVA is used as the thin film, (DH=99%), the wrinkle disappearance time can be as long as 5 minutes. FIG. 4(a) inset demonstrates the OM images of the wrinkling PVA top surface and the visibility of the "UCONN" logo captured at four characteristic points denoted as 1-4 in FIG. 4(a). The logo was invisible when Sample B exhibited an isotropic wrinkling pattern (wavelength=102 μm, FIG. 6 (b).); while the logo became visible as Sample B reversed back to a flat surface.

Figure 8:
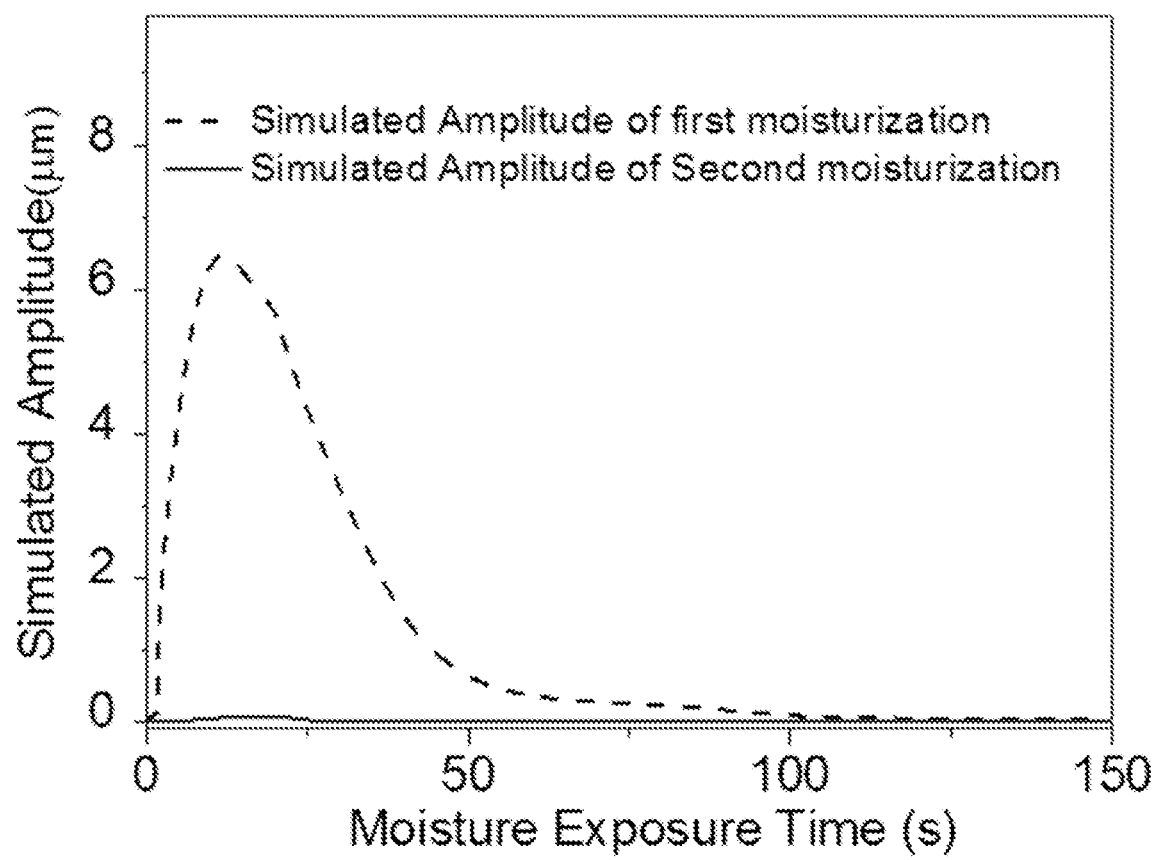
FIG. 8 shows the evolution of simulated wrinkle amplitude of Sample B with moisturizing time (the sample was dried prior to second moisture exposure).

To further understand this unique, irreversible wrinkling phenomenon, a FE model similar to the one used for Sample A was used to simulate the amplitude of the wrinkles under the moisturizing-drying cycles. The PVA film was modeled as a viscoelastic material to ensure a smooth change of the wrinkle amplitude as evident in the experiment. The computed wrinkles amplitude shows a good correlation with the measured UV-Vis spectra (FIG. 8.). The distinctive wrinkling dynamics of Sample B allows for the development of an intriguing moisture responsive optical device with the feature of "erase after read". Details of the fabrication process are provided in FIG. 4(b). When the device was exposed to moisture, the hidden pattern ("IMS") appeared and maintained for ca. 30 s before it was permanently erased, as shown in FIG. 4(c). Such a device, which can show the hidden pattern (e.g., information) and then permanently erase the pattern with a simple stimulus, can be used in applications such as encryption devices.

Figure 9:
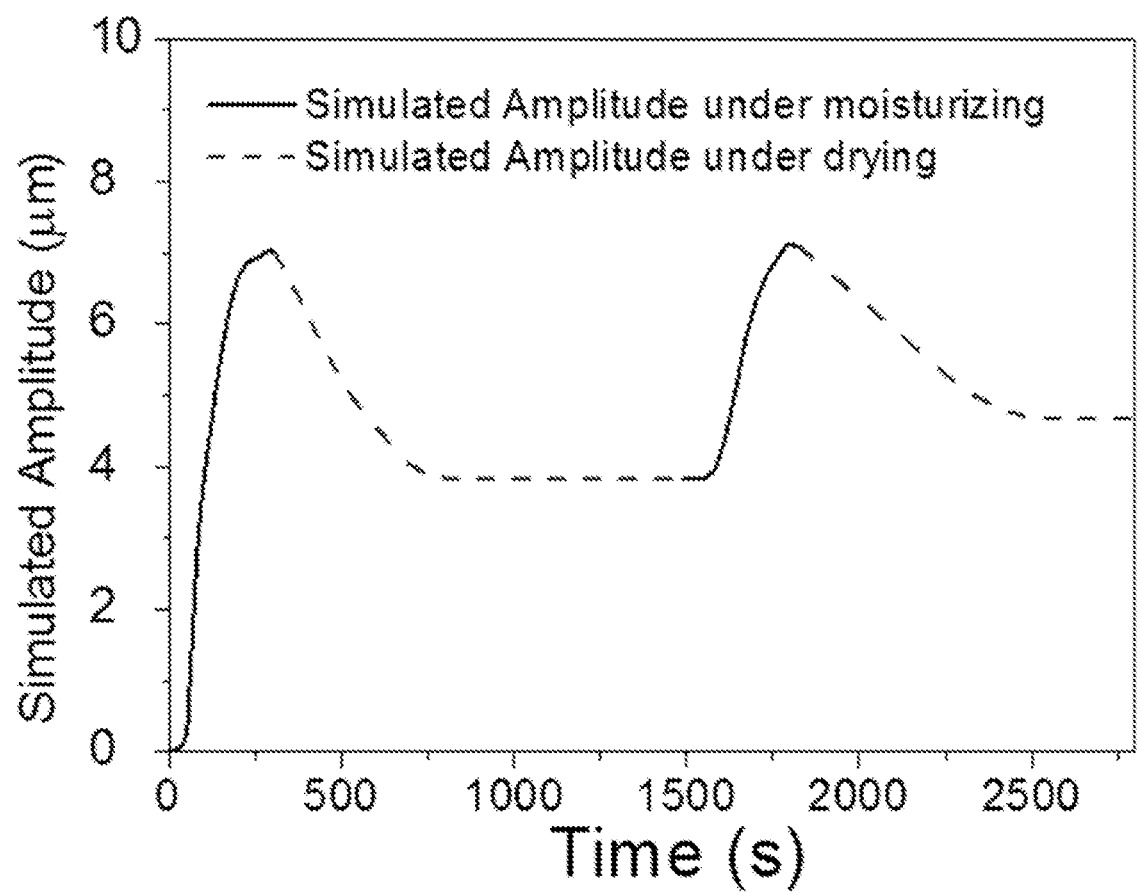
FIG. 9 shows the evolution of experimental UV-Vis transmittance spectra and simulated wrinkle amplitude of Sample C with two moisturizing-drying cycles.

Sample C demonstrates another form of irreversible wrinkling response, in which permanent wrinkles are formed after first moisture exposure. To achieve this result, a relatively thick PVA film with a thickness-wise crosslinking gradient was firmly attached onto a PDMS substrate, which is expected to generate a stable wrinkling surface. To obtain a crosslinking gradient, a PVA film containing sodium benzoate was crosslinked via UV radiation with exposure to the air, allowing oxygen to continuously diffuse into the PVA film with a decreasing concentration gradient toward the PVA-PDMS interface and consume the UV activated radicals for crosslinking reaction. The resulting crosslinking degree and modulus were lower on the top surface close to the air-PVA interface, gradually increasing through the film thickness. When moisture was applied, the swelling degree of the PVA film gradually decreased along the film thickness. This thickness-wise swelling gradient allowed the bottom layer of the PVA film and the substrate to exert a compressive force to the top layer of the film, leading to wrinkles formation when the critical condition is satisfied. During the drying process, the wrinkles relaxation time is proportional to the thickness, crosslink gradient of PVA film, and the modulus of PDMS. To lock the wrinkles structure, the relaxation time should be longer than the drying time. Thus, a thick, gradient-crosslinked PVA film with a thickness of 6.9 μm and a tougher PDMS substrate (base-to-curing agent ratio of 35:1, modulus about 110 kPa) were used. The schematic wrinkle dynamics of Sample C is shown in FIG. 5(e). The evolution of the UV-Vis transmittance spectra in the first two moisturizing-drying cycles are shown in FIG. 5(a). During the first moisturizing process, it took about 90 seconds to initiate the wrinkling surface, followed by an increase in the sample opaqueness. As dried, the transmittance was partially recovered at the beginning, followed by a steady state of 29% after dried for 530 seconds. This indicated that the wrinkling surface was finally stable in the dry condition. Upon the second moisturizing process, the transmittance decreased to 10% again and was returned to 29% as dried, showing that the wrinkling surface remained generally stable under further moisturizing-drying cycles. FIG. 5(a) inset shows the OM images of wrinkles patterns at four characteristic points denoted as 1-4 in FIG. 5(a). The wrinkles morphologies evolved from pseudo-hexagonal (point (1)) to peanut (point (2)) shapes, and were finally stabilized with a labyrinthic pattern (point (3)). As dried for 530 seconds, the labyrinthic wrinkling shape with a wavelength of about 76 μm (FIG. 6 (c).). FIG. 5(f) shows the intensity as a function of viewing angle for sample C as a diffusor and without diffusor A similar computational model was employed to capture the wrinkling response of Sample C. Here, the thin film was discretized into three layers to account for the thickness-wise cross-linking gradient. The top layer was modeled as a non-crosslinked PVA based on the film properties used in Sample B, while the middle and bottom layers were modeled using the properties of the cross-linked PVA used in Sample A. The stable wrinkling surface in the dry cycle can be captured by introducing a solidification effect in the top film layer, such as the top layer drying faster than the lower layers. Thus, at the beginning of the dry cycle, the top layer started to dry, while the lower layers still maintain a wrinkled shape. This lag led to the solidification effect, which set the wrinkled shape of the top layer, while the bottom layers of the film became flattened due to the reduced swelling strain and recovered modulus. This resulted in a stable wrinkling surface with a slightly smaller amplitude than that in the moisture cycle. The computed wrinkle amplitude shows a good correlation with the measured UV-Vis spectra (FIG. 9). The stable wrinkles in the ambient environment can be applied as light diffusors and anti-glare films due to the excellent light scattering capability of wrinkled surfaces (see FIG. 5(d) and FIG. 5(b), respectively). Moreover, the permanent wrinkle phenomenon generated by a relatively higher amount of moisture/water can be further applied as a water indicator for circuit boards. As shown in FIG. 5(c), the original transparent water indicator was attached onto a circuit board. After the indicator contact with a stream of water and then subsequently dried, the hidden "$H_2O$" pattern was revealed, indicating the circuit board was once exposed to water. The pattern stays even after the indicator was re-moisturized or dried.

Three distinctive types of moisture responsive wrinkling dynamics in a PVA-PDMS film-substrate system are described, including (A) completely reversible wrinkles formation; (B) irreversible wrinkles formation I: the initially formed wrinkles can be permanently erased and never reappear; and (C) irreversible wrinkles formation II: once wrinkles form, they can no longer be erased. The behavior of the systems can be tuned by adjusting both the mechanical and structural properties of the film and substrate, specifically, the moisture-dependent responsive properties of the PVA thin film by controlling the thickness, and crosslink degree/gradient, as well as the film-to-substrate thickness ratio. The evolution of wrinkles formation was manifested as the change of the transparency of the bilayer material. An FE model was developed to capture the three different wrinkling phenomena, and the predicted wrinkles amplitude correlated well with the direct light transmittance of the material. These unique responsive dynamics can be used in optical devices triggered by moisture, including anti-counterfeit tabs, encryption devices, water indicators, light diffusors, and anti-glare films, for example.

In an embodiment, the thin film polymer layer is PVA at a thickness of 0.1 to 10 μm; the substrate polymer layer is PDMS at a thickness of 0.5 to 3.0 mm and an elastic modulus of 1 Kpa to 1 Megapascals (Mpa); the PVA is uniformly crosslinked with an elastic modulus of 500 to 1500 MPa at 30% RH; and the system exhibits reversible wrinkling under moisture-drying cycles. In an embodiment of this system, the elastic modulus is 700 to 1500 MPa at 30% relative humidity.

In an embodiment, the thin film polymer layer is PVA at a thickness of 0.1 to 10 μm; the substrate polymer layer is PDMS at a thickness of 0.5 to 3.0 mm and an elastic modulus of 1 to 35 KPa; the PVA is non-crosslinked with an elastic modulus of 500 to 1500 MPa at 30% RH; and the system exhibits wrinkling upon moisture exposure and permanent reversal of the wrinkling upon subsequent drying or moisture exposure.

In an embodiment, the thin film polymer layer is PVA at a thickness of 5 to 15 μm; the substrate polymer layer is PDMS at a thickness of 0.5 to 3.0 mm and an elastic modulus of 75 KPa to 2 Mpa; the PVA has a crosslinking gradient across the thickness of the layer; and the system exhibits permanent wrinkling upon moisture exposure.

The following non-limiting examples further illustrate various embodiments described herein.

EXAMPLES

Preparation of Sample a Wrinkling Surface:

Transparent PVA (MOWIOL 8-88, $M_w$ (weight average molecular weight) about 67,000, and DH=88% from Kuraray, Japan) film containing 6 wt % sodium benzoate with a thickness of about 1.9 μm was prepared by casting its aqueous solution (concentration 10 mg/mL) on a pre-cleaned petri dish foundation made of polystyrene with a diameter of 60 mm. The PVA casting solution was dried under an infrared lamp at a temperature of about 55° C. Pure liquid PDMS (Sylgard-184, Dow Corning, base to curing agent ratio=65:1, thickness about 1 mm) was then coated on the dried PVA film and placed at room temperature for 12 hours (h), followed by thermal curing at 80° C. for 8 h. The cured bilayer sheet was then carefully peeled away from the foundation. The PVA top thin film was then covered by a removable PDMS film (base to curing agent ratio=10:1, thickness about 1 mm; this PDMS cover will be removed after crosslinking reaction finishes) and crosslinked under a UV radiation chamber (UVP Chromato-Vue C-70G, wavelength=245 nanometers (nm), intensity=300 microwatts per square centimeters (μW/cm$^2$)) for 4 h prior to placement in a desiccator with desiccant CaCl$_2$ for 12 h.

Preparation of Sample B Wrinkling Surface:

Transparent PVA (MOWIOL 8-88, $M_w$ about 67,000, and DH=88% from Kuraray, Japan) film with a thickness of ca.1.9 μm was prepared by casting its aqueous solution on a pre-cleaned petri dish foundation. The addition and curing process of PDMS layers was the same as that of Sample A. The cured bilayer sheet was then carefully peeled away from the foundation prior to the placement in a desiccator with desiccant CaCl$_2$ for 12 h.

Preparation of Sample C Wrinkling Surface:

Transparent PVA (MOWIOL 8-88, $M_w$ about 67,000, and DH=88% from Kuraray, Japan) films containing 17 wt % sodium benzoate with a thickness of about 6.9 μm was prepared by casting its aqueous solution on a pre-cleaned petri dish foundation. Pure liquid PDMS (Sylgard-184, Dow Corning, base to curing agent ratio=35:1, thickness about 1 mm) was then coated on the PVA film and placed at room temperature for 12 h, followed by thermal curing at 80° C. for 8 h. The PVA top thin film was then crosslinked in the air under a UV radiation chamber (UVP Chromato-Vue C-70G, wavelength=245 nm, intensity=300 μW/cm$^2$) for 4 h prior to placement in a desiccator with desiccant CaCl$_2$ for 12 h.

Anti-Counterfeit Tab Based on Sample A:

A patterned UV shielding stencil mask was placed atop Sample A (but not yet crosslinked) with a PDMS film covering the PVA top surface as shown in FIG. 2(b). The sample was then exposed to a UV radiation chamber (UVP Chromato-Vue C-70G, wavelength=245 nm, intensity=300 μW/cm$^2$) for 4 h. Subsequently, the PVA top surface was exposed to moisture (exposure time about 50 s) to allow the non-crosslinked area to form wrinkle first following by releasing back to flatten surface. This area will never form wrinkles again in subsequent drying/moisturizing circles, as detailed in the Sample B description above. The sample was then placed in a desiccator with desiccant CaCl$_2$ for 12 h. The device was then ready for use. Only the crosslinked patterned area can show the reversible wrinkles response upon moisturizing-drying circles, thus revealing the hidden pattern upon exposure to moisture.

Encryption Device Based on Sample B:

A waterproof patterned stencil mask was placed atop the Sample B surface, and the exposed patterned area was then moisturized for about 50 s, leading this area to form wrinkle first followed by releasing back to flatten surface and never form wrinkle again in subsequent drying/moisturizing circles. The mask was then removed from the sample prior to the placement in a desiccator with desiccant CaCl$_2$ for 12 h. The device was then ready for use. Only in the original area covered by mask, wrinkles will be initially formed and then permanently erased and never reformed again during the designed moisturizing-drying cycles.

Water Indicator Based on Sample C:

The modified Sample C used as a water indicator contained PVA (MOWIOL 28-99, Mw about 145,000, and DH=99% from Kuraray, Japan), 17 wt % sodium benzoate, and 0.04 wt % glutaraldehyde (GA). The trace amount of GA can form a low density of uniform crosslinking network, but doesn't affect the overall crosslink gradient generated by the UV crosslinking from sodium benzoate. A high Mw PVA with a high DH (i.e., MOWIOL28-99, instead of MOWIOL 8-88) and achieve a low level of crosslinking throughout the PVA by GA was selected to obtain an excellent dimensional stability after lengthy water immersion. A patterned UV shielding stencil mask was placed atop the aforementioned modified Sample C prior to exposure to UV radiation (UVP Chromato-Vue C-70G, wavelength=245 nm, intensity=300 μW/cm$^2$) for 4 h, followed by placement in a desiccator with desiccant CaCl2 for 12 h. The device was then ready for use, and only the patterned area with gradiently crosslinked network could form wrinkles upon contacting with water, which are stable in wet/dry state.

Computational Model:

The wrinkling response was simulated through a nonlinear post-buckling analysis using the commercial finite element software, ABAQUS (version 6.14-2). The PVA film was tied on the PDMS substrate by enforcing the displacement continuity across the film-substrate interface. The bilayer material was modeled as a 2D solid and meshed using the 8-node quadratic plane strain element with reduced integration, CPE8R. The left and right surfaces were restrained in the x-direction but free to move in the y-direction. The bottom surface of the PDMS substrate was restrained in the y-direction and free of shear tractions, while the top PVA surface is traction free. First, the linear buckling analysis was carried out based on the linear perturbation technique using the subspace solver available in ABAQUS. The mode shape of the first eigenmode was implemented as the initial geometrical imperfection in the subsequent post-buckling analysis using the nonlinear dynamic implicit solver. The constitutive responses of the PVA film, including the moisture-dependent modulus and swelling degree, were incorporated through the UMAT. This subroutine is called at each integration point at each time increment, and the material constitutive law and the stress components at the end of the increment are updated through user-defined options. To incorporate the damping effect in the constitutive model, the stress-strain relation becomes, $$\sigma_{xx}+\tilde{v}\dot{\sigma}_{xx}=\lambda\varepsilon_v+2\mu\varepsilon_{xx}+\tilde{\lambda}\dot{\varepsilon}_v+2\tilde{\mu}\dot{\varepsilon}_{xx}$$

$$\sigma_{yy}+\tilde{v}\dot{\sigma}_{yy}=\lambda\varepsilon_v+2\mu\varepsilon_{yy}+\tilde{\lambda}\dot{\varepsilon}_v+2\tilde{\mu}\dot{\varepsilon}_{yy}$$

$$\sigma_{zz}+\tilde{v}\dot{\sigma}_{zz}=\lambda\varepsilon_v+2\mu\varepsilon_{zz}+\tilde{\lambda}\dot{\varepsilon}_v+2\tilde{\mu}\dot{\varepsilon}_{zz}$$

$$\sigma_{xy}+\tilde{v}\dot{\sigma}_{xy}=2\mu\varepsilon_{xy}+2\tilde{\mu}\dot{\varepsilon}_{xy}$$

$$\sigma_{xz}+\tilde{v}\dot{\sigma}_{xz}=2\mu\varepsilon_{xz}+2\tilde{\mu}\dot{\varepsilon}_{xz}$$

$$\sigma_{yz}+\tilde{v}\dot{\sigma}_{yz}=2\mu\varepsilon_{yz}+2\tilde{\mu}\dot{\varepsilon}_{yz} \quad (S.1)$$

where $\lambda$ and $\mu$ are Lamé constants, and $\tilde{\lambda}$, $\tilde{v}$ and $\tilde{\mu}$ are damping parameters. The strain rate, $\dot{\varepsilon}$, is approximated at each time step using a central difference scheme as, $$\dot{\varepsilon} \approx \frac{\varepsilon\left(t+\frac{1}{2}\Delta t\right)-\varepsilon\left(t-\frac{1}{2}\Delta t\right)}{\Delta t} \quad (S.2)$$

Note that the stress update is time dependent, which gives the dynamic process of wrinkle formation and disappearance. For the crosslinked PVA, the viscous effect was neglected by setting the damping parameters to zero. The damping parameters $\tilde{v}=10.00$, $\tilde{\lambda}=1428.57$ and $\tilde{\mu}=357.14$ were used for the non-crosslinked PVA to match the experiment results. Based on the FEA results, applying different damping parameters ($\tilde{\lambda}$, $\tilde{v}$ and $\tilde{\mu}$) may result in an unstable wrinkle shape.

Determination of the Moisture-Dependent PVA Properties:

The swelling strain was assumed to be a function of the water uptake, M, as, $$\varepsilon_{swell} = \frac{1}{(1-M)^{1/3}} - 1 \quad (S.3)$$

Based on a literature reference, the limit of the equilibrium water uptake of the PVA film is 9.0±0.2%, resulting in a swelling strain of 2.5% at the fully moisturized state. For these purposes, it is assumed that the swelling strain increases exponentially as a function of time, which follows the same trend of the water uptake of the PVA film in the wet conditions.

The modulus of the PVA in the dry state was obtained from tensile tests. The modulus of moisturized PVA was back calculated based on $$\lambda = 2\pi t\left(\frac{\overline{E_f}}{3\overline{E_s}}\right)^{1/3},$$

where $\lambda$ is the wrinkle wavelength measured in the experiment. For the crosslinked PVA, $\lambda=128$ μm, t=1.9 μm, $\overline{E_s}=0.03$ MPa, and the modulus of the moisturized PVA is approximated as 100 MPa. For the non-crosslinked PVA, a small modulus of 0.03 MPa is used, because the moisturized PVA is in a gel state. It is assumed that the modulus of the PVA drops rapidly once the PVA film is exposed to the moisture and then becomes stable.

Characterization:

Microscope images for the moisture responsive wrinkling dynamics were recorded on an optical microscope (AmScope ME 520TA) under reflective mode. The surface profile of the wrinkling patterns were examined on a ZYGO NewView 5000 non-contact white light profilometer. The evolution of the direct transmittance of all three samples under moisturizing-drying cycles was conducted on a Perkin Elmer ultraviolet/visible/near-infrared (UV/Vis/NIR) Lambda 900 spectrophotometer at 600 nm wavelength. To test the direct transmittance, the PVA-PDMS bilayer device was attached onto the sample holder inside the sample compartment. A cool mist flow (relative humidity (RH) >100%) generated by an ultrasonic humidifier was applied on the PVA top surface, resulting in the formation and/or deformation of moisture responsive wrinkles. All the digital photos were captured by an iPhone 6 Plus. Attenuated total reflectance Fourier transform infrared (ATR-FTIR) spectra for confirming the UV crosslinking reaction in Samples A and C were recorded on a Nicolet Magna 560 spectrophotometer. X-ray diffraction (XRD) patterns of Sample B were recorded on a Bruker D5 diffractometer with a graphite monochromator with Cu Kα radiation. White light profilometer diagram of Sample A wrinkling surface after 10 s of moisture exposure is shown in FIG. 6(a). White light profilometer diagram of Sample B wrinkling surface after 10 s of moisture exposure is shown in FIG. 6(b). White light profilometer diagram of Sample C wrinkling surface in the dried state is shown in FIG. 6(c).

The compositions, methods, articles and other aspects are further described by the Embodiments below.

Embodiment 1

A moisture responsive system comprising: a thin film polymer layer, wherein the thin film polymer comprises a hydrophilic polymer; and a substrate polymer layer, wherein the substrate polymer comprises a hydrophobic elastomer; wherein the thin film polymer layer is attached to the substrate polymer layer at a bottom surface of the thin film polymer layer and the thin film polymer layer has a top surface opposing the bottom surface.

Embodiment 2

The moisture responsive system of Embodiment 1, wherein the thin film polymer layer is attached to the substrate polymer layer through interfacial adhesion.

Embodiment 3

The moisture responsive system of Embodiment 1, wherein the thin film polymer layer further comprises a crosslinking agent.

Embodiment 4

The moisture responsive system of Embodiment 3, wherein the thin film polymer layer comprises a uniformly covalently crosslinked polymer having an elastic modulus of 700 to 1500 MPa at 30% relative humidity.

Embodiment 5

The moisture responsive system of Embodiment 1, wherein the thin film polymer layer is a non-crosslinked polymer.

Embodiment 6

The moisture responsive system of Embodiment 3, wherein the thin film polymer layer comprises a gradient of crosslinking degree across the thin film polymer layer from the bottom surface to the top surface.

Embodiment 7

The moisture responsive system of Embodiment 6, wherein the crosslinking degree in the thin film polymer layer is higher at the top surface and lower at the bottom surface.

Embodiment 8

The moisture responsive system of Embodiment 3, wherein the thin film polymer layer has a degree of crosslinking of 15% to 50%.

Embodiment 9

The moisture responsive system of Embodiment 1, wherein the hydrophilic polymer is polyvinylalcohol (PVA), polystyrene sulfonate, polyacrylic acid, polyethylenimine, other water or organic soluble polymers, or a combination comprising at least one of the foregoing.

Embodiment 10

The moisture responsive system of Embodiment 1, wherein the hydrophobic elastomer comprises polyurethane rubber, polyacrylate rubber, acrylic rubber, natural rubber, fluoroelastomers, ethylene-propylene rubber (EPR), ethylene-butene rubber, ethylene-propylene-diene monomer rubber (EPDM), epichlorohydrin rubber, acrylate rubbers, hydrogenated nitrile rubber (HNBR), silicone elastomers, polyether block amides, ethylene vinyl acetate, styrene-butadiene-styrene (SBS), styrene-butadiene rubber (SBR), styrene-(ethylene-butene)-styrene (SEBS), acrylonitrile-butadiene-styrene (ABS), acrylonitrile-ethylene-propylene-diene-styrene (AES), styrene-isoprene-styrene (SIS), styrene-(ethylene-propylene)-styrene (SEPS), methyl methacrylate-butadiene-styrene (MBS), high rubber graft (HRG), polydimethylsiloxane (PDMS), or a combination comprising at least one of the foregoing.

Embodiment 11

The moisture responsive system of Embodiment 1, wherein the hydrophobic elastomer comprises polydimethylsiloxane (PDMS).

Embodiment 12

The moisture responsive system of Embodiment 1, wherein the thickness of the substrate polymer layer is from 0.5 mm to 3 mm and the thickness of the thin film polymer layer is from 0.1 µm to 15 µm.

Embodiment 13

The moisture responsive system of Embodiment 1, wherein the elastic modulus of the substrate polymer layer is between 1 kPa and 2 MPa.

Embodiment 14

A method of making a moisture responsive system, comprising: applying a thin film polymer layer to a foundation; applying a substrate polymer layer on the thin film polymer layer; curing the substrate polymer layer to form a thin film polymer layer/substrate polymer bilayer; and removing the thin film polymer layer/substrate polymer bilayer from the foundation.

Embodiment 15

The method of Embodiment 14, further comprising crosslinking the thin film polymer layer.

Embodiment 16

A method of using a moisture responsive system, comprising: providing a moisture responsive system comprising: a thin film polymer layer, wherein the thin film polymer comprises a hydrophilic polymer; and a substrate polymer layer, wherein the substrate polymer comprises a hydrophobic elastomer; wherein the thin film polymer layer is attached to the substrate polymer layer at a bottom surface of the thin film polymer layer and the thin film polymer layer has a top surface opposing the bottom surface; and applying moisture to the moisture responsive system.

Embodiment 17

The use of the moisture responsive system of Embodiment 1 in an anti-counterfeit device, encryption device, water indicator, light diffusor, or antiglare film.

Embodiment 18

The use of the moisture responsive system of Embodiment 4 in a multiply reversible responsive system, wherein the system shows surface wrinkling upon exposure to moisture and a reversal of the surface wrinkling upon removing moisture, and wherein the system shows surface wrinkling upon multiple subsequent exposures to moisture, each exposure to moisture being preceded by removal of moisture.

Embodiment 19

The use of the moisture responsive system of Embodiment 5 in a single permanently responsive system, wherein the system shows surface wrinkling upon exposure to moisture and a reversal of the surface wrinkling upon removing moisture and wherein the system does not show surface wrinkling upon subsequent exposure to moisture.

Embodiment 20

The use of the moisture responsive system of Embodiment 6 in a permanently responsive system, wherein the system shows a permanent surface wrinkling upon exposure to moisture.

Embodiment 21

The moisture responsive system of Embodiment 1, wherein the thin film polymer layer is PVA at a thickness of 0.1 to 10 µm; the substrate polymer layer is PDMS at a thickness of 0.5 to 3.0 mm and an elastic modulus of 1 Kpa to 1 Mpa; the PVA is uniformly crosslinked with an elastic modulus of 500 to 1500 MPa at 30% RH; and the system exhibits reversible wrinkling under moisture-drying cycles.

Embodiment 22

The moisture responsive system of Embodiment 21, wherein the elastic modulus is 700 to 1500 MPa at 30% relative humidity.

Embodiment 23

The moisture responsive system of Embodiment 1, wherein the thin film polymer layer is PVA at a thickness of 0.1 to 10 μm; the substrate polymer layer is PDMS at a thickness of 0.5 to 3.0 mm and an elastic modulus of 1 to 35 KPa; the PVA is non-crosslinked with an elastic modulus of 500 to 1500 MPa at 30% RH; and the system exhibits wrinkling upon moisture exposure and permanent reversal of the wrinkling upon subsequent drying or moisture exposure.

Embodiment 24

The moisture responsive system of Embodiment 1, wherein, the thin film polymer layer is PVA at a thickness of 5 to 15 μm; the substrate polymer layer is PDMS at a thickness of 0.5 to 3.0 mm and an elastic modulus of 75 KPa to 2 Mpa; the PVA has a crosslinking gradient across the thickness of the layer; and the system exhibits permanent wrinkling upon moisture exposure.

The contents of U.S. Provisional application Ser. No. 62/376,987 is expressly incorporated herein in its entirety.

All documents cited herein, all referenced publications cited therein, and the descriptions and information contained in these documents are expressly incorporated herein in their entirety to the same extent as if each document or cited publication was individually attached and expressly incorporated herein.

While the invention has been described with reference to exemplary embodiments, it will be understood by those skilled in the art that various changes may be made and equivalents may be substituted for the elements thereof without departing from the scope of the invention. In addition, many modifications may be made to adapt the teaching of the invention to particular use, application, manufacturing conditions, use conditions, composition, medium, size, and/or materials without departing from the essential scope and spirit of the invention. Therefore, it is intended that the invention not be limited to the particular embodiments and best mode contemplated for carrying out this invention as described herein, but that the invention will include all embodiments falling within the scope of the appended claims.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting of the true scope of the invention disclosed herein. It is also to be understood that the terminology used herein is for the purpose of describing particular embodiments only, and is not intended to be limiting. Since many modifications, variations, and changes in detail can be made to the described examples, it is intended that all matters in the preceding description and shown in the accompanying figures be interpreted as illustrative and not in a limiting sense.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and words of a similar nature in the context of describing the improvements disclosed herein (especially in the context of the following claims) are to be construed to cover both the singular and the plural, unless otherwise indicated herein or clearly contradicted by context. The term "or" means "and/or" unless clearly indicated otherwise by context. Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments. In general, the compositions or methods may alternatively comprise, consist of, or consist essentially of, any appropriate components or steps herein disclosed. The invention may additionally, or alternatively, be formulated so as to be devoid, or substantially free, of any components, materials, ingredients, adjuvants, or species, or steps used in the prior art compositions or that are otherwise not necessary to the achievement of the function and/or objectives of the present claims. "Optional" or "optionally" means that the subsequently described event or circumstance may or may not occur, and that the description includes instances where the event occurs and instances where it does not. Unless specified to the contrary herein, all test standards are the most recent standard in effect at the time of filing this application.

The endpoints of all ranges directed to the same component or property are inclusive of the endpoints, are independently combinable, and include all intermediate points and ranges. The suffix "(s)" as used herein is intended to include both the singular and the plural of the term that it modifies, thereby including one or more of that term (e.g., the colorant(s) includes one or more colorants). The terms "first," "second," and the like, "primary," "secondary," and the like, as used herein do not denote any order, quantity, or importance, but rather are used to distinguish one element from another. The terms "front", "back", "bottom", and/or "top" are used herein, unless otherwise noted, merely for convenience of description, and are not limited to any one position or spatial orientation. The term "combination" is inclusive of blends, mixtures, alloys, reaction products, and the like. Unless defined otherwise, technical and scientific terms used herein have the same meaning as is commonly understood by one of skill in the art to which this invention belongs.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

The modifier "about" used in connection with a quantity is inclusive of the stated value and has the meaning dictated by the context (e.g., it includes, at a minimum the degree of error associated with measurement of the particular quantity).

All methods described herein can be performed in any suitable order unless otherwise indicated herein or otherwise clearly contradicted by context. The use of any and all examples, or exemplary language (e.g., "such as"), is intended merely to better illustrate the invention and does not pose a limitation on the scope of the invention or any embodiments unless otherwise claimed.

What is claimed is:

1. A bi-layer moisture responsive system consisting of:
a thin film polymer layer and a substrate polymer layer,
   wherein the thin polymer layer has a thickness of 0.1 micrometers to 15 micrometers, wherein the thin film polymer comprises a hydrophilic polymer which is polyvinyl alcohol and has an elastic modulus of at least 700 MPa at 30% relative humidity; and the substrate polymer layer has a thickness of 0.5 mm to 3 mm, and comprises a hydrophobic elastomer which is a polydimethylsiloxane and has an elastic modulus of 1 kPa to 2 MPa;
   wherein the thin film polymer layer is attached to the substrate polymer layer at a bottom surface of the thin film polymer layer to form a structure and the thin film polymer layer has a top surface opposing the bottom surface, and wherein optical properties of the structure change upon exposure to moisture.

2. The bi-layer moisture responsive system of claim 1, wherein the thin film polymer layer is attached to the substrate polymer layer through interfacial adhesion.

3. The bi-layer moisture responsive system of claim 1, wherein the thin film polymer layer further comprises a crosslinking agent.

4. The bi-layer moisture responsive system of claim 3, wherein the thin film polymer layer has a degree of crosslinking of 15% to 50%.

5. The bi-layer moisture responsive system of claim 3, wherein the thin film polymer layer comprises a uniformly covalently crosslinked polymer having an elastic modulus of 700 to 1500 MPa at 30% relative humidity.

6. The bi-layer moisture responsive system of claim 5 wherein the structure shows surface wrinkling upon exposure to moisture and a reversal of the surface wrinkling upon removing moisture, and wherein the structure shows surface wrinkling upon multiple subsequent exposures to moisture, each exposure to moisture being preceded by removal of moisture.

7. The bi-layer moisture responsive system of claim 1, wherein the thin film polymer layer is a non-crosslinked polymer.

8. The bi-layer moisture responsive system of claim 1, wherein the thickness of the substrate polymer layer is from 1 mm to 3 mm.

9. The bi-layer moisture responsive system of claim 1 which is an anti-counterfeit device, an encryption device, a water indicator, a light diffusor, or an antiglare film.

10. The bilayer moisture responsive system of claim 1 wherein the structure shows surface wrinkling upon exposure to moisture and a reversal of the surface wrinkling upon removing moisture and wherein the structure does not show surface wrinkling upon subsequent exposure to moisture.

11. The bi-layer moisture responsive system of claim 1 wherein the thin film polymer layer has a thickness of 5 to 15 µm; and the substrate polymer layer has an elastic modulus of 75 kPa to 2 MPa; the PVA has a crosslinking gradient across the thickness of the layer; and the system exhibits permanent wrinkling upon moisture exposure.

12. The bi-layer moisture responsive system of claim 1 wherein the thin film has a thickness of 1.9 to 6.7 micrometers.

13. The bi-layer moisture responsive system of claim 1 which is transparent in a flattened state.

14. A moisture responsive system consisting of a thin film polymer layer, wherein the thin film polymer comprises a hydrophilic polymer, and a substrate polymer layer, wherein the substrate polymer comprises a hydrophobic elastomer which is a polydimethylsiloxane;
   wherein the thin film polymer layer is attached to the substrate polymer layer at a bottom surface of the thin film polymer layer to form a structure and the thin film polymer layer has a top surface opposing the bottom surface, and wherein optical properties of the structure change upon exposure to moisture
   wherein the thin film polymer layer comprises a gradient of crosslinking degree across the thin film polymer layer from the bottom surface to the top surface.

15. The moisture responsive system of claim 14, wherein the crosslinking degree in the thin film polymer layer is lower at the top surface and higher at the bottom surface.

16. The bi-layer moisture responsive system of claim 14 wherein the structure shows a permanent surface wrinkling upon exposure to moisture.

17. A method of using a moisture responsive system, comprising: providing the bilayer moisture responsive system of claim 1; and
   applying moisture to the moisture responsive system to change the optical properties of the structure.

* * * * *